United States Patent Office 2,775,261
Patented Dec. 25, 1956

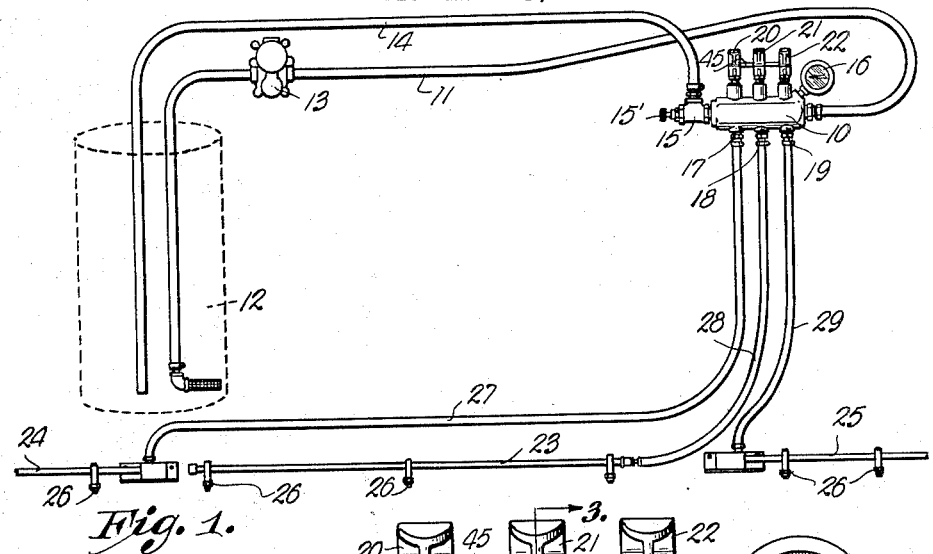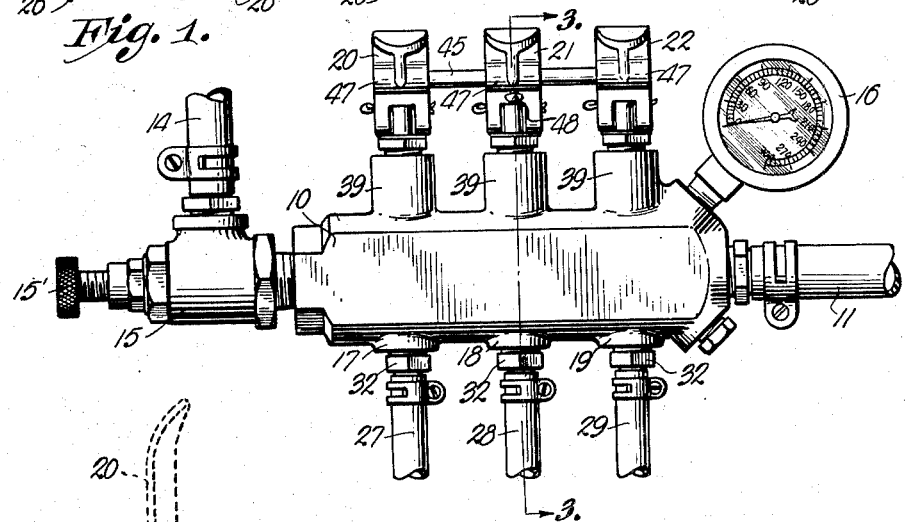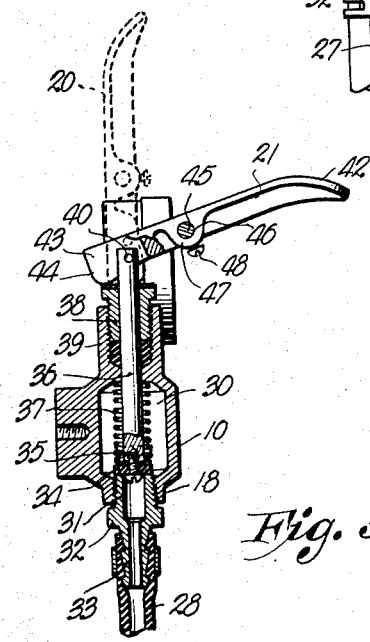

2,775,261

VALVED MANIFOLD FOR FIELD SPRAYING EQUIPMENT

Lester G. Ziller, Kansas City, Mo., assignor to Comfort Equipment Company, a corporation of Missouri Application March 8, 1951, Serial No. 214,567

2 Claims. (Cl. 137—635)

This invention relates to field spraying equipment and deals more particularly with a field sprayer of the type that may be detachably mounted on a tractor or other suitable vehicle.

An object of this invention is to provide a field sprayer in which the spraying pressure is easily adjustable and maintains the pressure at the adjusted setting through the whole system; and in which the pressure is clearly shown on a clearly visible pressure gauge.

Another object of this invention is to provide a field sprayer having a spray system which includes a valved manifold and simply and quickly operable manual control means for opening and closing the valves of the manifold; and means adjustable to tie together a plurality of the valves selectively, to open and close simultaneously and adjustable to untie the valves selectively to open and close independently.

A further object of this invention is to provide a valved manifold suitable for use in a field sprayer, the manifold having easily replaceable valve seats for the valves of the manifold.

Other objects of this invention will be in part obvious and in part pointed out hereinafter.

The general construction involved in this invention is believed to be adequately indicated in the above statements of the objects of this invention and, therefore, restatement is believed to be unnecessary.

In order that a clearer understanding of this invention may be had, attention is hereby directed to the accompanying drawings, forming a part of this application and illustrating certain possible embodiments of this invention and in which:

Fig. 1 shows schematically a sprayer embodying this invention with the spray liquid tank indicated in dash lines, Fig. 2 is a front elevation of the manifold of the spray system including end portions of the conduit connections thereto; and Fig. 3 is a sectional view through the manifold at one of the valves with the valve closed and indicating in dotted lines the position of the operating lever when the valve is open; the view being taken on the line 3—3 of Fig. 2.

Similar reference characters refer to similar parts throughout the several views of the drawings.

Referring to the drawing, the sprayer includes a manifold 10, a hose or other suitable conduit 11 leading from a spray fluid container 12 through a pump 13 to the manifold 10, and a return hose or conduit 14 leading from the manifold 10 back to the spray fluid container 12, and an adjustable pressure regulating valve 15 is associated with the conduit 14 at the manifold 10. The manifold also has a pressure gauge 16 in responsive communication with the interior of the manifold 10, the face of the gauge being clearly visible so that the indicated pressure is easily readable.

The manifold, on its underside, has three valve outlets, 17, 18 and 19 and has levers 20, 21 and 22 on the top of the manifold 10 for operating the valves in these outlets.

The sprayer has three individual spray booms comprising a center boom 23, a left hand boom 24 and a right hand boom 25, each equipped with suitably spray nozzles 26. A hose 27 leads from the manifold outlet 17 to the left hand boom 24, a hose 28 leads from the center manifold outlet 18 to the center boom 23 and a hose 29 leads from the right hand manifold outlet 19 to the right hand boom 25.

As shown in Fig. 3, the manifold 10 has a manifold chamber 30. Each of the three outlets 17, 18 and 19 is interiorly threaded and is adapted to have screwed therein a threaded end 31 of a hose nipple 32, or similar suitable fitting, which has an end 33 protruding outside of the manifold 10 and suited for connection with the end of a hose or other suitable conduit, such as 27, 28 or 29. The upper end of this nipple 32 extends into the manifold chamber 30 and constitutes a valve seat for a valve 34 disposed within the manifold chamber 30. This valve 34 is secured, as by screw 35, to a valve stem or plunger 36, the valve and plunger being resiliently pressed toward the valve seat of the nipple 32 by a spring 37 which encircles the stem 36 and is compressed between the valve 34 and the upper wall of the manifold chamber 30. Valve stem 36 extends upwardly through an aperture therefor in the manifold 10, and through a plug 38 which is threadedly seated in a boss 39 formed on the top of the manifold 10. To the top of the valve stem 36 is rotatably secured, as by pin 40, a lever 21 having a finger end 42 and a cam end 43 at the plug 38. The arrangement is such that when the lever 21 is in nearly horizontal position, the spring 37 forces the valve 34 against the valve seat of the nipple 32 and the valve is closed, and by raising the lever 21, the cam end 43 moving over the top of the plug 38 raises the valve stem 36 and the valve becomes open. When the lever 21 is raised to vertical, it will remain in that position, due to the flat end 44 of the lever 21 resting on the flat top of the plug 38. The valves and operating means of all of the valves are similar.

Means are provided which may be adjusted so that either all three of the valves may be tied together to open and close simultaneously or the center lever may be tied to either of the side levers so that either of the two corresponding pairs of valves will open and close simultaneously, or the means may be disconnected from the operating levers 20, 21 and 22 so that the valves operate independently of each other. Such means may comprise a rod 45 or the like, slidably and removably engageable in apertures, such as 46, provided in bosses 47 on each of the valve levers, the center lever 21 preferably carrying a set screw 48 whereby the rod 45 may be locked against axial movement relatively to the levers. By engaging this rod 45 in the apertures in all three of the levers 20, 21 and 22, the three levers are so tied together that their valves open and close simultaneously. By shifting rod 45 to the left and out of engagement with lever 22, the two left hand levers 20 and 21 may be tied together and the lever 22 left free, and by sliding the rod 45 to the right, levers 21 and 22 can be tied together and the lever 20 left free, and by removing the rod 45 entirely, all three of the levers 20, 21 and 22 are freed to operate independently of each other.

It is suggested that the manifold 10, with its operating levers 20, 21 and 22, pressure gauge 16 and pressure valve 15, which latter may be regulated as by its regulating knob 15', be mounted in convenient reach and sight of the driver of the tractor or other vehicle on which the sprayer is mounted. As stated, by adjusting or removing the tie rod 45, any of the valves to the booms, or various combinations of them, may be operated in accordance with which boom, or booms, the driver desires to put in operation, or to turn off. Also, as stated hereinbefore, the spray fluid tank 12 may be of any of the standard types that are now procurable on the market.

It is apparent from the above that the field sprayer described herein embodies the improvements hereinbefore mentioned as being comprehended by the objects of this invention, and repetition is believed to be unnecessary.

As many changes may be made in the above construction and as many different embodiments of this invention may be made without departing from the scope thereof, it is to be understood that all matter contained in the above description or shown in the accompanying drawing shall be interpreted as illustrative and not in a limiting sense.

Having thus describe my invention, I claim:

1. Manifold construction of the character described including, in combination, a manifold having an elongate manifold chamber, an inlet port and a plurality of outlet ports for said chamber, said outlet ports being arranged in a row along one side of said chamber, a valve seat member mounted in each outlet port and presenting a valve seat within the chamber, a row of valves mounted within said manifold and operable to close upon and open from said valve seat, a manually operable pivotal lever for each valve, said levers being arranged in parallel relation outside of said manifold, and a tie rod extending transversely across said levers and slidably received in alinged apertures formed in the respective levers, said rod being longitudinally adjustable in and out of said apertures selectively so as to tie two or more levers together to operate as a rigid unit.

2. Manifold construction as in claim 1 including releasable means for locking said tie rod in a predetermined position.

References Cited in the file of this patent

UNITED STATES PATENTS

| | | |
|---|---|---|
| 609,290 | Norton | Aug. 16, 1898 |
| 622,114 | Burdett | Mar. 28, 1899 |
| 622,547 | Shedlock et al. | Apr. 4, 1899 |
| 1,265,953 | Pittman | May 14, 1918 |
| 1,524,225 | Allen et al. | Jan. 27, 1925 |
| 1,530,858 | Shaw | Mar. 24, 1925 |
| 1,550,275 | Mulling | Aug. 18, 1925 |
| 1,596,982 | McKechnie | Aug. 24, 1926 |
| 1,797,591 | Sartakoff | Mar. 24, 1931 |
| 2,056,954 | Bryant | Oct. 13, 1936 |
| 2,164,295 | Mott | June 27, 1939 |
| 2,169,043 | Goehring | Aug. 8, 1939 |
| 2,432,309 | Gore | Dec. 9, 1949 |